March 31, 1953  W. C. FILLEBROWN  2,633,028
PICK-OFF DEVICE
Filed Oct. 31, 1949

INVENTOR.
WILLIAM C. FILLEBROWN
BY
ATTORNEY

Patented Mar. 31, 1953

2,633,028

UNITED STATES PATENT OFFICE 2,633,028

PICK-OFF DEVICE

William C. Fillebrown, Hasbrouck Heights, N. J., assignor to Bendix Aviation Corporation, Teterboro, N. J., a corporation of Delaware Application October 31, 1949, Serial No. 124,613

14 Claims. (Cl. 74—5.6)

The invention relates to signal pick-off devices and more particularly to such devices which provide signals corresponding to the relative positions of two or more members.

One object of the present invention is to provide capacity signals corresponding to the relative positions of a plurality of members, one of which is universally supported.

Another object is to provide capacity signals in response to pivotal movement of a member about mutually perpendicular axes relative to another member.

Another object is to provide a novel pick-off for a gyroscope which develops capacity signals in response to relative movement of the gyroscope rotor casing and housing about mutually perpendicular axes.

Another object is to provide a novel pick-off device for a gyroscope which exerts no torque on the gyroscope and which requires no lead-in wires through the gimbal and rotor case pivots.

Another object is to provide a vertical index having condenser means which provides capacity signals corresponding to the relative positions of a fixed member and a pendulously mounted member.

The invention contemplates an arcuate member and a cup-shaped member movable relative to one another and the latter member has a plurality of arcuate plates with pairs of plates oppositely disposed from one another. The arcuate member cooperates with the plates to form condensers of variable capacities. One of the members is universally supported and the capacities of the condensers vary according to the relative positions of the members.

The foregoing and other objects and advantages of the invention will appear more fully hereinafter from a consideration of the detailed description which follows, taken together with the accompanying drawing wherein two embodiments of the invention are illustrated. It is to be expressly understood, however, that the drawing is for the purposes of illustration and description only, and is not to be construed as defining the limits of the invention.

Figure 1:
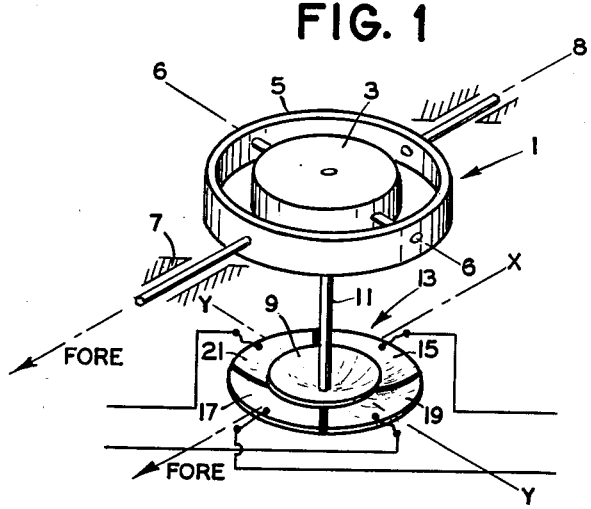
Figure 1 is a perspective view showing a gyroscope provided with a novel pick-off device constructed according to the present invention.

Referring now to the drawing for a more detailed description of the novel pick-off device of the present invention, the latter is shown in Figure 1 as applied to a non-pendulous gyroscope 1 which includes a rotor casing 3 rotatable in a gimbal 5 about an axis 6 extending transversely of the craft in which the gyroscope is mounted. The gimbal is pivoted to a housing 7 for rotation about an axis 8 extending fore and aft of the craft.

A spherical segmental element 9 is supported at its center of curvature from the gyro casing 3 by a rod 11 for universal movement about mutually perpendicular axes 6, 8. A spherical cup-shaped member 13, concentric with element 9, is rigid with housing 7 and includes four spherical sector-like plates 15, 17, 19, 21 insulated from one another. Each plate has adjacent edges inclined to one another and the edges of successive plates are in edge-to-edge relationship. A pair of plates 15, 17 are oppositely disposed from one another and a pair of plates 19, 21 are oppositely disposed from one another and the plates are symmetrically disposed about mutually perpendicular center lines X and Y of the plates extending parallel to the mutually perpendicular axes of the gyroscope. Element 9 cooperates with plates 15, 17, 19, 21 to form condensers of variable capacities. With relative movement of element 9 and member 13 the air gap therebetween remains constant. As element 9 pivots about axis 6 and moves to one side or the other of center line Y, the area of element 9 opposing plate 15 and the area of element 9 opposing plate 17 change relative to one another and the capacities of the condensers formed by element 9 and plate 15 and element 9 and plate 17 vary accordingly. The difference in the capacities of the condensers may be used to control a servo system as described below. Also, as element 9 pivots about axis 8 and moves to one side or the other of center line X, the area of element 9 opposing plate 19 and the area of element 9 opposing plate 21 change relative to one another, and the capacities of the condensers formed by element 9 and plate 19 and element 9 and plate 21 vary accordingly. The difference in the capacities of the condensers may be used to control another servo system (not shown).

Pivotal movement of element 9 about both axes 6 and 8 simultaneously relative to member 13 changes the relative capacities of the condensers formed by the element and oppositely disposed plates 15, 17 and 19, 21.

Figure 2:
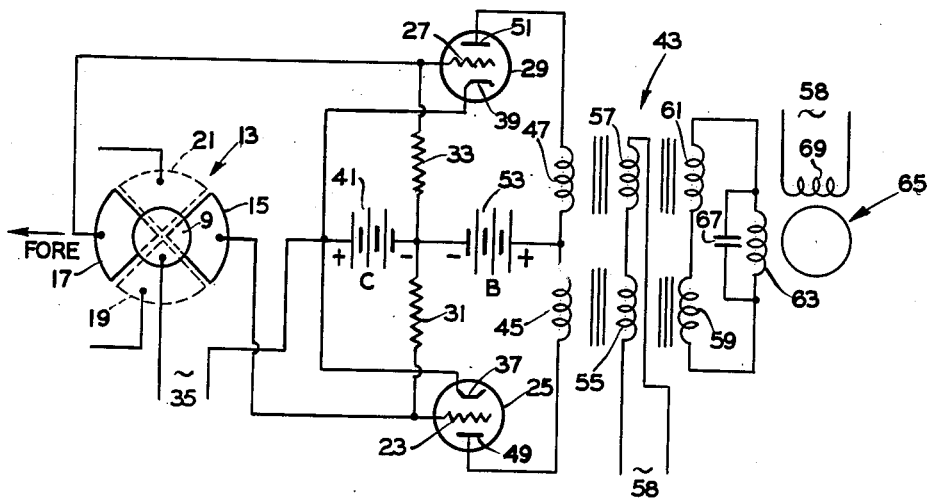
Figure 2 is a schematic wiring diagram showing a circuit arrangement for utilizing the signals from the novel pick-off to control a servo system.

In Figure 2, plate 15 is connected to the grid 23 of a tube 25 and plate 17 is connected to the grid 27 of a tube 29. Grids 23, 27 are connected together through resistors 31, 33. An alternating current source 35 is connected to element 9 and to the cathodes 37, 39 of tubes 25, 29 respectively. Grids 23, 27 preferably are biased by a C voltage 41 connected between resistors 31, 33 and to cathodes 37, 39 so that no current flows in the tubes in the absence of signals as will occur when element 9 is symmetrically positioned relative to plates 15, 17.

A magnetic amplifier 43 has its saturating windings 45, 47 connected between the plates 49, 51 of tubes 25, 29, respectively. A suitable B voltage 53 has its positive terminal connected between windings 45, 47 and has its negative terminal connected between resistors 31, 33. Primary windings 55, 57 of magnetic amplifier 43 are connected to an alternating power source 58 with the same frequency as or different frequency from the frequency of source 35, and secondary windings 59, 61 oppose one another and are connected in series with the variable phase 63 of a two-phase motor 65. A phasing condenser 67 is connected in parallel with variable phase 63. The fixed phase 69 of motor 65 is connected directly to power source 58.

When element 9 moves in a fore and aft direction relative to plates 15, 17, the capacities of the condensers formed by element 9 and plate 15 and by element 9 and plate 17 change relative to one another so that the impedances in the grid circuits vary accordingly and one or the other of tubes 25, 29 conducts. Current flows through one or the other of saturating windings 45, 47 to reduce the effectiveness of the associated primary and secondary windings and provide for current flow through the secondary windings so that motor 65 operates in one direction or the other. Likewise, plates 19, 21 may be connected in a similar servo system and provide signals in response to movement of element 9 and member 13 about the craft transverse axis.

Figure 3:
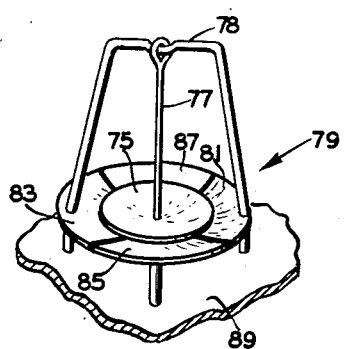
Figure 3 is a perspective view of a vertical index constructed according to the invention.

In Figure 3, a vertical index includes a spherical segmental element 75 pendulously suspended by a wire, chain or other suitable means 77 from a support 78 for universal movement relative to a spherical cup-shaped member 79 including spherical sector-like plates 81, 83, 85, 87 corresponding generally to plates 15, 17, 19, 21 of Figure 1. Element 75 and pairs of opposing plates 81, 83 and 85, 87 may be connected in circuits corresponding to the circuit of Figure 2 to control a servo system in response to relative movement of member 75 from the vertical. The index may be mounted on a universally supported platform 89 and the platform may be maintained in horizontal position by a pair of servo systems of the kind shown in Figure 2 arranged to level the platform about horizontal axes at right angles to one another.

Although but two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a device of the kind described, a cup-shaped member including a plurality of arcuate plates insulated from one another, a spherical segmental member opposing said cup-shaped member and cooperating with said plates to form condensers of variable capacities, and means for supporting one of said members for universal movement to vary the capacities of the condensers.

2. In a device of the kind described, a cup-shaped member including four arcuate plates insulated from one another and with pairs of plates symmetrically disposed about mutually perpendicular center lines of said plates, and a spherical segmental member opposing said cup-shaped members and cooperating with said plates to form condensers of variable capacities, one of said members being mounted for swinging movement about mutually perpendicular axes relative to said other member and the relative capacities of one pair of plates and the arcuate member varying as the relative areas of the arcuate member opposing said plates change.

3. In a device of the kind described, a cup-shaped member including a plurality of arcuate plates insulated from one another, and a spherical segmental element supported for universal movement relative to said member and opposing said cup-shaped member and cooperating with said plates to provide condensers of variable capacities, the capacity of each of said condensers varying according to the relative positions of said element and member.

4. In a device of the kind described, a plurality of arcuate plates insulated from one another and forming a cup-shaped member, pairs of said plates being symmetrically disposed about the axis of said member and the plates of each pair being equal in area, and a spherical segmental element supported for universal movement relative to said plates and opposing said cup-shaped member and cooperating with each of said plates to form a condenser of variable capacity, the capacity of one plate of each pair and said element being equal to the capacity of the other plate of each pair and said element when the axes of said member and said element are coincident with one another.

5. A device of the kind described in claim 4 in which the capacity of one plate of each pair and the element varies relative to the capacity of the other plate of each pair and the element when the axes of said element and member are non-coincident and the axis of said element moves out of symmetry with the plates of said pairs.

6. In a device of the kind described, a pair of spherical segmental members opposing one another, means for supporting one of said members for universal movement, one of said members having a plurality of spherical sector-like plates insulated from one another, and said other member and each of said plates being positioned and arranged to form a condenser and the capacity of each of said condensers varying with relative movement of said members and corresponding to the relative positions of said members.

7. In a device of the kind described, a pair of spherical segmental members spaced from and opposing one another, means for supporting one of said members for universal movement, one of said members having a plurality of spherical sector-like plates insulated from one another and positioned with pairs of plates oppositely disposed, and said other member and each of said plates being positioned and arranged to form a condenser and the capacity of each of said condensers varying with relative movement of said members, and each pair of plates and said other member being adapted to cooperate with an alternating current source to provide a signal corresponding to the relative positions of said members.

8. In combination a gyroscope having a housing, a rotor casing rotatable about mutually perpendicular axes relative to said housing, a cup-shaped member including a plurality of arcuate plates insulated from one another, and a spherical segmental member movable relative to and opposing said cup-shaped member and cooperating with said plates to form condensers of variable capacities, one of said members being secured to said housing and the other member being secured to said rotor casing, and the change in capacity of said condensers corresponding to the relative positions of said rotor casing and housing.

9. In combination a gyroscope having a housing, a rotor casing rotatable about mutually perpendicular axes relative to said housing, a spherical segmental member having a plurality of sector-like plates insulated from one another and secured to said housing, and a spherical segmental element secured to said rotor casing and received within said spherical segmental member and cooperating with said plates to change the capacity of the condensers corresponding to the relative positions of said rotor casing and housing.

10. In a device of the kind described, a cup-shaped member including a plurality of arcuate plates insulated from one another, and a spherical segmental member spaced from and opposing said cup-shaped member and cooperating with said plates to form condensers of variable capacities, one of said members being pendulously supported for universal movement relative to said other member and changing the capacity of the condensers in response to movement of said pendulously mounted member from the vertical.

11. In a device of the kind described, a spherical segmental member including four spherical sector-like plates, a spherical segmental element pendulously mounted for universal movement relative to said member and opposing said member and cooperating with said plates to provide condensers of variable capacities, pairs of said plates being oppositely disposed and the center lines of said pairs of plates being mutually perpendicular, the relative capacities of one pair of plates and the element varying as said element moves to one side of the center line of the other pair of plates.

12. In a device of the kind described, a cup-shaped member including a plurality of spherical sector-like plates insulated from one another, and a spherical segmental member concentric with said cup-shaped member and cooperating with said plates to form condensers of variable capacities, and means for supporting one of said members at its center of curvature for swinging movement about mutually perpendicular axes.

13. In a device of the kind described, a cup-shaped member including four arcuate plates insulated from one another and each plate having adjacent edges inclined to one another and with the edges of successive plates in edge-to-edge relationship, and a spherical segmental member within said cup-shaped member and cooperating with said plates to form condensers of variable capacities, and means for supporting one of said members for universal movement relative to the other member to vary the capacities of said condensers.

14. In a device of the kind described, a cup-shaped member including four arcuate plates insulated from one another with adjacent plates positioned in edge-to-edge relation and with pairs of plates diametrically opposed relative to the axis of said member, and a spherical segmental member concentric with said cup-shaped member and cooperating with said plates to form condensers of variable capacities, and means for supporting one of said members at its center of curvature for swinging movement about mutually perpendicular axes relative to the other member to vary the capacities of said condensers.

WILLIAM C. FILLEBROWN.

REFERENCES CITED

The following references are of record in the file of this patent:

UNITED STATES PATENTS

| Number | Name | Date |
|---|---|---|
| 1,297,313 | Bellini | Mar. 18, 1919 |
| 1,988,458 | Minorsky | Jan. 22, 1935 |
| 1,999,215 | Smith | Apr. 30, 1935 |
| 2,089,987 | Urfer | Aug. 17, 1937 |
| 2,219,003 | Braunschweig | Oct. 22, 1940 |
| 2,425,868 | Dillon | Aug. 19, 1947 |